United States Patent
Adibowo

(10) Patent No.: US 10,635,502 B2
(45) Date of Patent: Apr. 28, 2020

(54) SCALABLE, MULTI-TENANT MACHINE LEARNING ARCHITECTURE FOR CLOUD DEPLOYMENT

(71) Applicant: SAP SE, Walldorf (DE)

(72) Inventor: Sasmito Adibowo, Singapore (SG)

(73) Assignee: SAP SE, Walldorf (DE)

( * ) Notice: Subject to any disclaimer, the term of this patent is extended or adjusted under 35 U.S.C. 154(b) by 107 days.

(21) Appl. No.: 15/711,455

(22) Filed: Sep. 21, 2017

(65) Prior Publication Data
US 2019/0087239 A1    Mar. 21, 2019

(51) Int. Cl.
| G06F 9/52 | (2006.01) |
| G06F 11/07 | (2006.01) |
| G06F 9/50 | (2006.01) |
| G06N 20/00 | (2019.01) |
| H04L 12/24 | (2006.01) |
| G06N 20/20 | (2019.01) |
| G06F 11/34 | (2006.01) |
| H04L 12/26 | (2006.01) |

(52) U.S. Cl.
CPC ............... *G06F 9/52* (2013.01); *G06F 9/50* (2013.01); *G06F 11/0709* (2013.01); *G06N 20/00* (2019.01); *G06N 20/20* (2019.01); *H04L 41/145* (2013.01); *G06F 11/3409* (2013.01); *G06F 11/3495* (2013.01); *H04L 43/0817* (2013.01)

(58) Field of Classification Search
CPC ....................................................... G06F 9/52
See application file for complete search history.

(56) References Cited

U.S. PATENT DOCUMENTS

| 9,251,035 B1* | 2/2016 | Vazac | G06F 11/3495 |
| 2012/0054551 A1* | 3/2012 | Gao | G06F 11/3664 |
| | | | 714/38.1 |
| 2014/0156557 A1* | 6/2014 | Zeng | G06Q 10/0631 |
| | | | 705/348 |
| 2016/0232457 A1* | 8/2016 | Gray | G06T 11/206 |
| 2016/0239336 A1* | 8/2016 | Bingham | G06F 9/45533 |

OTHER PUBLICATIONS

Thrashing (Computer Science)—Wikipedia; https://en.wikipedia.org/wiki/Thrashing_(computer_science) reviewed May 16, 2017; 4 pages.

* cited by examiner

*Primary Examiner* — Sisley N Kim
(74) *Attorney, Agent, or Firm* — Fish & Richardson P.C.

(57) ABSTRACT

Implementations of the present disclosure include methods, systems, and computer-readable storage mediums for training ML models in aPaaS architectures including actions of receiving, at a training master provided using a first VM, a training request to train a ML model, the training request being received from a first tenant in a multi-tenant, aPaaS architecture, initiating, by the training master, training of the ML model by a training worker provided using a second VM, during training of the ML model, periodically updating training storage metadata based on metadata describing progress of the training of the ML model, and in response to completion of the training of the ML model, storing a trained ML model in a model storage of the aPaaS architecture.

20 Claims, 6 Drawing Sheets

SCALABLE, MULTI-TENANT MACHINE LEARNING ARCHITECTURE FOR CLOUD DEPLOYMENT

BACKGROUND

Deploying machine learning (ML) solutions to cloud infrastructures can be problematic. In particular, deploying ML solutions to an application platform-as-a-service (aPaaS) is a formidable challenge. For example, there is an impedance mismatch between underlying assumptions in aPaaS architectures, and the requirements of a multi-tenant ML solution. More plainly stated, the aPaaS tends to be geared for transaction-processing systems, which typically are more I/O-bound, while ML systems are more compute-bound.

In some examples, an aPaaS packages server software into self-contained, stateless virtual machines (VMs) with minimal computational resources assigned to each (e.g., single-core, small virtual CPU, and limited memory). The VMs should not store any data, and instead delegate persistence to database services adjacent to the aPaaS environment. Any files stored inside the VM's virtual disk gets removed when it is restarted. However, this multiple, stateless, small VMs paradigm is a source of difficulty when deploying ML services. Notably, the need for long running periods of compute-bound processing, and having large client-dependent state does not readily fit the aPaaS paradigm.

SUMMARY

Implementations of the present disclosure include computer-implemented methods for machine learning (ML) in cloud infrastructures. More particularly, implementations of the present disclosure are directed to ML using stateless, virtual machines (VMs) in an application platform-as-a-service (aPaaS) architecture.

In some implementations, actions for training ML models in aPaaS architectures include receiving, at a training master provided using a first VM, a training request to train a ML model, the training request being received from a first tenant in a multi-tenant, aPaaS architecture, initiating, by the training master, training of the ML model by a training worker provided using a second VM, during training of the ML model, periodically updating training storage metadata based on metadata describing progress of the training of the ML model, and in response to completion of the training of the ML model, storing a trained ML model in a model storage of the aPaaS architecture. Other implementations include corresponding systems, apparatus, and computer programs, configured to perform the actions of the methods, encoded on computer storage devices.

These and other implementations may each optionally include one or more of the following features: initiating training of the ML model is performed in response to determining that the ML model is able to be trained based on one or more of a status of the ML model, and a timestamp associated with the ML model; action further include, during training of the ML model, scaling, by a training instance provisioner, a number of instances of training workers based on one or more of a number of pending training requests, and a number of completed trainings; actions further include determining that training of the ML model by the training worker provided using the second VM was incomplete, and in response continuing training of the ML model by a training worker provided using a third VM; training of the ML model is continued based on the metadata describing progress of the training of the ML model stored in the training storage metadata; actions further include receiving, by an inference worker provided using a third VM, an inference request to provide an inference result using the trained ML model, and processing the inference request to return the inference result; and the second VM includes more computing resources than the first VM.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
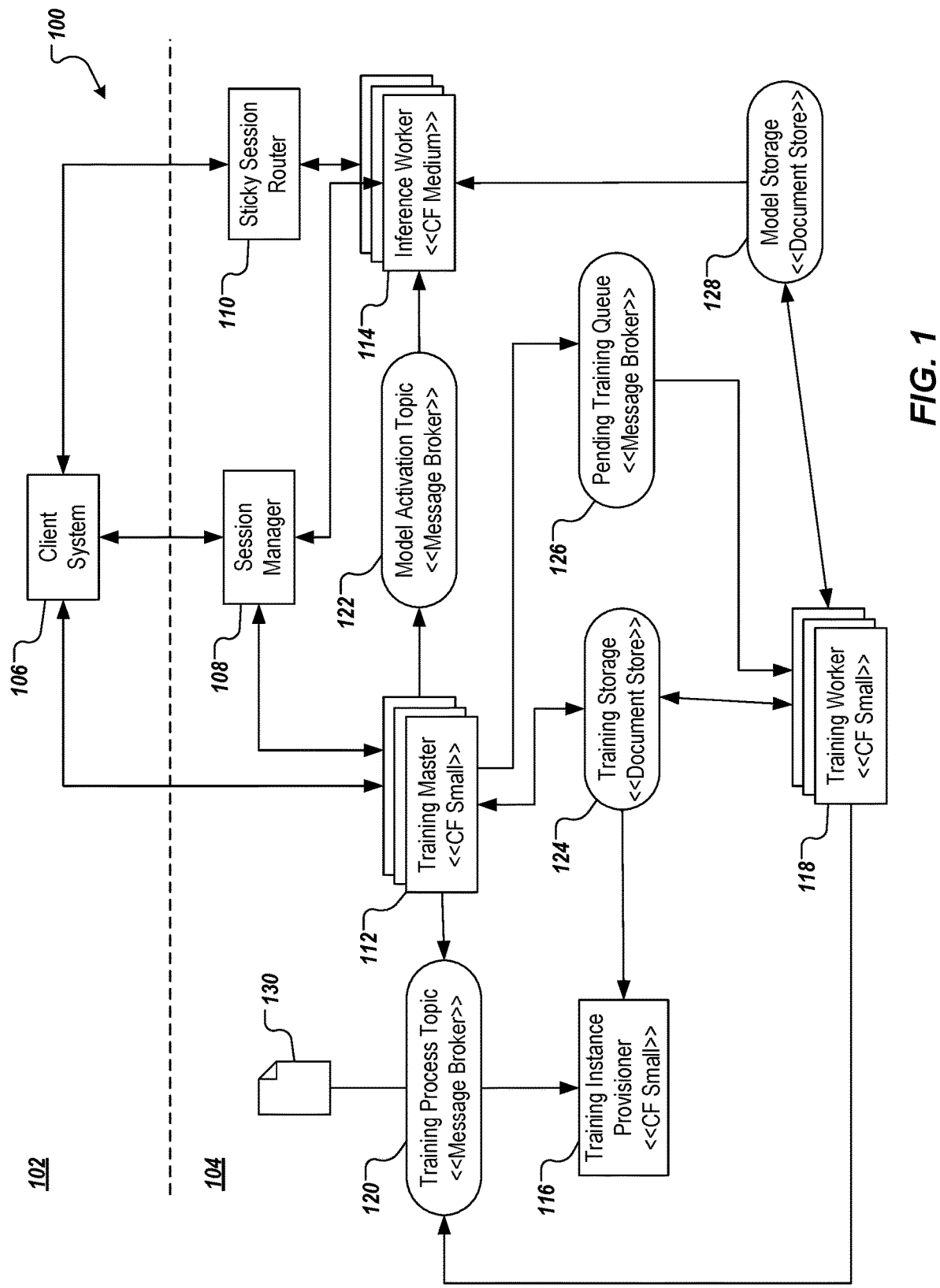
FIG. 1 depicts an example machine learning architecture 100 in accordance with implementations of the present disclosure.

Implementations of the present disclosure include computer-implemented methods for machine learning (ML) in cloud infrastructures. More particularly, implementations of the present disclosure are directed to ML using stateless, virtual machines (VMs) in an application platform-as-a-service (aPaaS) architecture. In some implementations, actions for training ML models in aPaaS architectures include receiving, at a training master provided using a first VM, a training request to train a ML model, the training request being received from a first tenant in a multi-tenant, aPaaS architecture, initiating, by the training master, training of the ML model by a training worker provided using a second VM, during training of the ML model, periodically updating training storage metadata based on metadata describing progress of the training of the ML model, and in response to completion of the training of the ML model, storing a trained ML model in a model storage of the aPaaS architecture.

Cloud computing can be described as Internet-based computing that provides shared computer processing resources, and data to computers and other devices on demand. Cloud infrastructures enable multiple tenants (e.g., client systems) to access to hosted cloud computing resources. An aPaaS is a category of cloud computing services that provides a platform to enable development, execution, and management of cloud applications. In some examples, an aPaaS can be provided as a public cloud service, or as a private cloud service. An example aPaaS includes Cloud Foundry provided by the Cloud Foundry Foundation of San Francisco, Calif. Cloud Foundry (CF) is an open source aPaaS. For purposes of illustration, implementations of the present disclosure are described with reference to CF. It is contemplated, however, that implementations of the present disclosure can be realized with any appropriate aPaaS.

In general, CF works by packaging server software into self-contained virtual machines (VMs) with minimal computational resources assigned to each (e.g., single-core, small virtual CPU, and limited memory. Scaling is achieved by replicating these VM instances, either on the same hardware, on multiple physical hardware, or even across data centers. CF expects these VMs to be stateless. Consequently, by default network requests are distributed evenly across VMs regardless of the client. Furthermore, the VMs should not store any data, and instead delegate persistence to database services adjacent to the CF environment. Any files stored inside the VM's virtual disk gets removed when it is restarted. However, this multiple, stateless, small VMs paradigm is a source of difficulty when deploying ML services. Notably, the need for long running periods of compute-bound processing, and having large client-dependent state does not readily fit the pigeonholes devised by CF.

On the inference side, a ML model can easily take a large portion of the memory available to an application instance. Since these models are tenant-specific, this severely limits the instance to serve only a handful of tenants. On the training side, the operation that creates ML models is long-running and takes up most of the computational power of an application instance. This effectively locks that application instance to process only a few training requests for a relatively long duration (e.g., several hours). Moreover training processes are run relatively infrequently for a given tenant. These are typically done in response of re-organizations or changes in the tenant's environment. Consequently, a relatively large pool of training application instances would likely be idle most of the time. This would be unfortunate, because the corresponding application instances are likely to be provisioned as larger VMs (those with faster processing speed and/or more memory), and have higher running costs.

In view of this context, implementations of the present disclosure provide a system architecture that works around limitations of aPaaS offerings, such as CF, to deploy multitenant ML services. The architecture of the present disclosure would be able to grow linearly with the size of the user base similar to the typical transaction-oriented CF applications, but provide domain-specific ML services across a heterogeneous user base. In some implementations, and as described in further detail herein, implementations of the present disclosure provide: inference services that loads/unloads ML models dynamically, and assisted by sticky sessions to alleviate thrashing; training applications (ML model creation), in which a class of large-capacity CF instances, referred to as Training Workers, handle long-running training requests posted by a pool of lesser-powered Training Manager instances; and a Training Provisioner application that monitors the number of pending training, requests and adjusts the size (number of instances) of the Training Worker application by interacting with the CF environment.

Implementations of the architecture of the present disclosure are particularly suitable for ML solutions provided as standard offerings, where knowledge of each tenant's application (e.g., business) environment is required. In some examples, a standard offering indicates that no code change (modification of the software) is required to onboard a tenant into the ML system. Knowledge of the tenant's application (e.g., business) environment would be embedded in the ML models that every tenant would need to train based on their own sample (training) data. In other words, a tenant would have at least one custom ML model used for their own inference operations. Examples of ML solutions that can be implemented with the architecture of the present disclosure include, without limitation, customer service ticket classification, product photo recognition, and fleet maintenance schedule prediction.

As described in further detail herein, implementations of the present disclosure provide an ML architecture to enable training, and use of ML models in cloud infrastructures. The ML architecture of the present disclosure leverages VMs of aPaaS platforms in a manner that addresses shortcomings of such platforms. More particularly, the ML architecture of the present disclosure supports multi-tenancy by providing one or more training managers that interact with respective training instance provisioners to coordinate one or more training workers (provided as VMs), which train the ML model. During training of the ML model, operation of the respective training workers is determined, and the progress of training of the ML model is tracked (per training epoch), and stored. In the event that a training worker is taken offline during training of the ML model, progress of the training is not lost. Instead, another training worker can be provisioned, and resumes training of the ML model from the last recorded training epoch. Implementations of the present disclosure also include one or more inference workers (provided as VMs) that provide inference (prediction) functionality using training ML models.

FIG. 1 depicts an example ML architecture 100 in accordance with implementations of the present disclosure. In the example of FIG. 1, the example ML architecture 100 includes a client-side 102, and an aPaaS-side 104. The client-side 102 includes a client system 106. In some examples, the client system 106 includes one or more computing devices. Example computing devices include any appropriate type of computing device such as a desktop computer, a laptop computer, a handheld computer, a tablet computer, a web server, an application server, a proxy server, a network server, and/or a server pool. In some examples, the client system 106 communicates with the aPaaS-side 104 over a network, which can include, without limitation, a large computer network, such as a local area network (LAN), a wide area network (WAN), the Internet, a cellular network, a telephone network (e.g., PSTN), or an appropriate combination thereof connecting any number of communication devices, mobile computing devices, fixed computing devices and server systems.

In some examples, the client system 106 can be referred to as a tenant in a multi-tenant paradigm, in which multiple tenants interact with the aPaaS-side 104 to perform ML activities in accordance with implementations of the present disclosure. For example, the client system 106 can establish a session with the aPaaS-side 104, which can be concurrent, and/or contemporaneous with sessions of one or more other tenants (e.g., other client systems not depicted).

In accordance with implementations of the present disclosure, the aPaaS-side 104 includes a session manager 108, a sticky session router 110, one or more training masters 112, one or more inference workers 114, a training instance provisioner 116, and one or more training workers 118. In some examples, each of the above components can be provided as one or more computer-executable programs executed using one or more computing devices. In some examples, and as described above, one or more VMs can be instantiated to provide one or more components of the aPaaS-side 104. For example, each of a training manager 112, an inference worker 114, the training instance provisioner 116, and a training worker 118 can be provided using an appropriately sized VM (e.g., CF small, CF medium, CF large). In some examples, a size of the VM indicates a relative level of resources (e.g., computing cores, memory) provided by the VM.

In the depicted example, the aPaaS-side 104 further includes a training process topic 120, a model activation topic 122, a training storage 124, a pending training queue 126, and a model storage 128. In some examples, a document 130 is provided, which records training requested events, and training completed events.

In some implementations, the client system 106 is first authenticated by the aPaaS-side 104 executing an authentication protocol. In some examples, the client system 106 communicates with the aPaaS-side 104 through an application program interface (API) exposed by the aPaaS-side 104. In some examples, the client system 106 sends a request for a session token to the aPaas-side 104 through the API, which request is received by the session manager 108. In some examples, the request includes a key, and a secret that had been previously established between the client system 106, and the aPaaS-side 104. In this manner, the client system 106 identifies itself to the aPaaS-side 104. In some examples, the session manager 108 processes the key and secret to authenticate the client system 106. If the client-system 106 is not authenticated, an error message can be provided. If the client system 106 is authenticated, a session is established between the client system 106, and the aPaaS-side 104, and the session manager 108 returns a session token to the client system 106. The client system 106 uses the session token for further interactions with the aPaaS-side 104 during the session.

In some implementations, and as described in further detail herein, the client system 106 interacts with the aPaaS-side 104 to train one or more ML models, and/or to conduct inference using one or more trained ML models. For example, the client system 106 can send a request (with the session token) to a training master 112 to instantiate training of a ML model. In some examples, the training manager 112 validates the request with the session manager 108 using the session token provided with the request. If the request is validated, the training master 112 coordinates training of the ML model, as described herein, and returns one or more results to the client system 106. As another example, the client system 106 can send a request (with the session token) to an inference worker 114 to instantiate inference using a trained ML model. In some examples, the inference worker 114 validates the request with the session manager 108 using the session token provided with the request. If the request is validated, the inference worker 114 coordinates inference using a trained ML model, as described herein, and returns one or more results to the client system 106.

Figure 2:
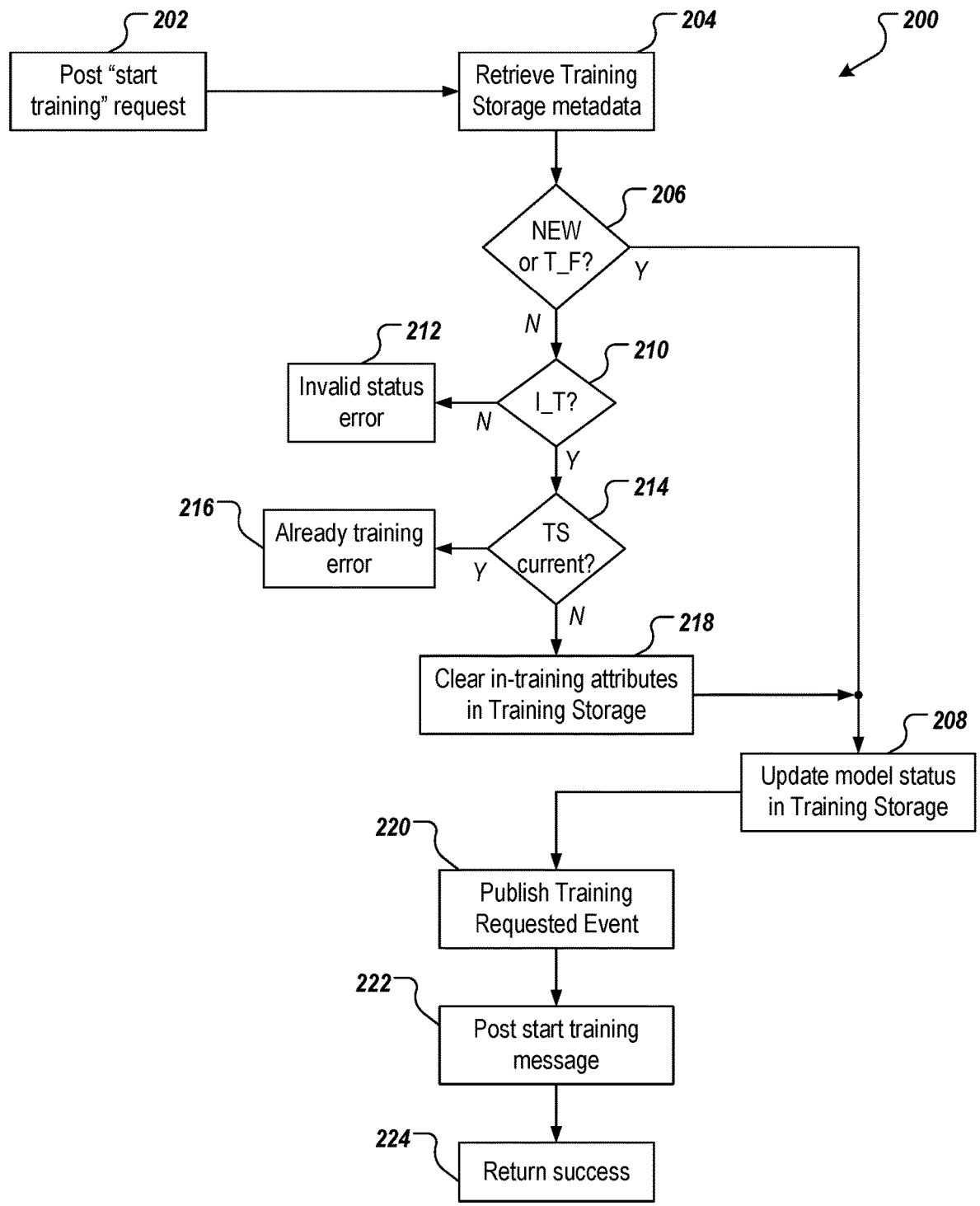
FIG. 2 depicts an example start training process in accordance with implementations of the present disclosure.

FIG. 2 depicts an example start training process 200 in accordance with implementations of the present disclosure. In some implementations, the example process 200 may be performed using one or more computer-executable programs executed using one or more computing devices. In some examples, at least a portion of the example training process 200 is coordinated by a training master 112 to start training of a ML model. Training of a ML model can be described as providing a ML technique (e.g., a learning algorithm used to train the ML model), and training data to learn from. In some examples, the ML model refers to the model artifact that results from the training process, and is also referred to as a trained ML model. In some examples, the training data represents one or more targets, or target attributes that the ML model is trained to infer (predict). In general, during training, the learning algorithm is executed to find patterns in the training data that map the input data attributes to the target, and the trained ML model captures the patterns. Any appropriate training technique can be used. Consequently, a more detailed description of ML model training is foregone.

As one non-limiting example, ML training can include linear regression executed over the training data to provide an equation (ML model) that describes one or more patterns extracted from the training data. In some examples, the equation includes one or more variables, and one or more coefficients, the values of which are determined through the training process. It is contemplated, however, that implementations of the present disclosure can be used for training any appropriate type of ML model (e.g., binary classification, multiclass classification, regression).

In some implementations, each ML model is set to one of a plurality of statuses (states). In some examples, the ML model transitions between statuses. Example statuses include, without limitation, a new status (e.g., the model is newly provided, and is not trained), an invalid status (e.g., a data quality issue is present, a configuration issue is present), a training requested (T_R) status (e.g., a request to train the ML model has been received), an in training (I_T) status (e.g., training of the ML model is being performed), a training failed (T_F) status (e.g., training of the ML model has been started, but failed for some reason), a ready status (e.g., the ML model has been trained, and is available for use in inference (prediction)), and an active status (e.g., the trained ML model is being used for inference).

Referring again to FIG. 2, a start training request is posted 202. For example, the client system 106 of FIG. 1 posts a start training request to the aPaaS-side 104. In some examples, the start training request includes an identifier indicating the training data (e.g., sample data set) that is to be used (e.g., previously uploaded, or otherwise made available for training). In some examples, the identifier indicated can be unified with the ML model identifier as the training data is no longer needed once a model was derived from it. In some examples, the start training request also includes credentials of the client system (e.g., user-ID/password pair, API Key/API Secret pair, or another authentication token) to prevent the system from arbitrarily accepting a start training request from anyone. In response to the start training request, training storage metadata is retrieved (204). For example, the training master 112 retrieves training storage metadata from the training storage 124.

It is determined whether the ML model that is to be trained has either a new status, or a T_F status (206). For example, the training storage can be queried to determine the status of the ML model. If the ML models has either a new status, or a T_F status, the status of the ML model is updated by the training master 112 in the training storage 124 (208). For example, the status of the ML model is updated to T_R. If the ML models has neither a new status, nor a T_F status, it is determined whether the ML model has an I_T status (210). If the ML model does not have an I_T status, the status of the ML model is determined to be invalid (e.g., for training), and an invalid status error is output (212). For example, the training master 112 outputs an invalid status error to the client system 106. If the ML model does have an I_T status, it is determined whether an epoch timestamp (TS) is current (214). For example, the training master 112 determines a difference between a current time (e.g., the time at which the start training request was received), and the last-recorded TS, and, if the difference is less than a threshold difference, the TS is determined to be current. If the TS is determined to be current, an error is returned to indicate that training of the ML model is in progress. For example, the training master 112 outputs a training in-progress error to the client system 106.

If the TS is determined not to be current, any in-training attributes are cleared (218), and the status of the ML model is updated (208). In some examples, the TS is not current, because a training worker process unexpectedly terminated (e.g., before training was completed). In some examples, the training master 112 clears an in-training attributes stored for the ML model in the training storage 124, and updates the status of the Ml model in the training storage 124 (e.g., to T_R). Example in-training attributes include, without limitation, a universally unique identifier (UUID) of the training worker 118 that had been training the ML model, and a last epoch TS update.

A training requested event is published (220). For example, the training master 112 publishes the training requested event to publicize that training of the ML model has been requested. In some examples, the training requested event is received by the training process topic 120, and one or more instances of the training worker 118 can be provisioned. A start training message is posted (222). For example, the training master 112 posts the start training message to publicize that training of the ML model has started. In some examples, the start training message is sent to the pending training queue 126, and includes a tenant identifier (e.g., Tenant_ID, which uniquely identifies the client system 106 requesting training of the ML model), a model identifier (e.g., Model_ID, which uniquely identifies the ML model that is to be trained), and an offline validation token. In some examples, an offline validation token can be described as data that grants the user access to certain computing resources for a given amount of time. The token is offline, because the gatekeeper does not need to consult the token issuer to ensure the token's validity. It achieves this because the token is cryptographically signed and contains the validity time, among other information. A success message is returned (224). For example, the training master 112 provides a success message to the client system 106.

Figure 3A:
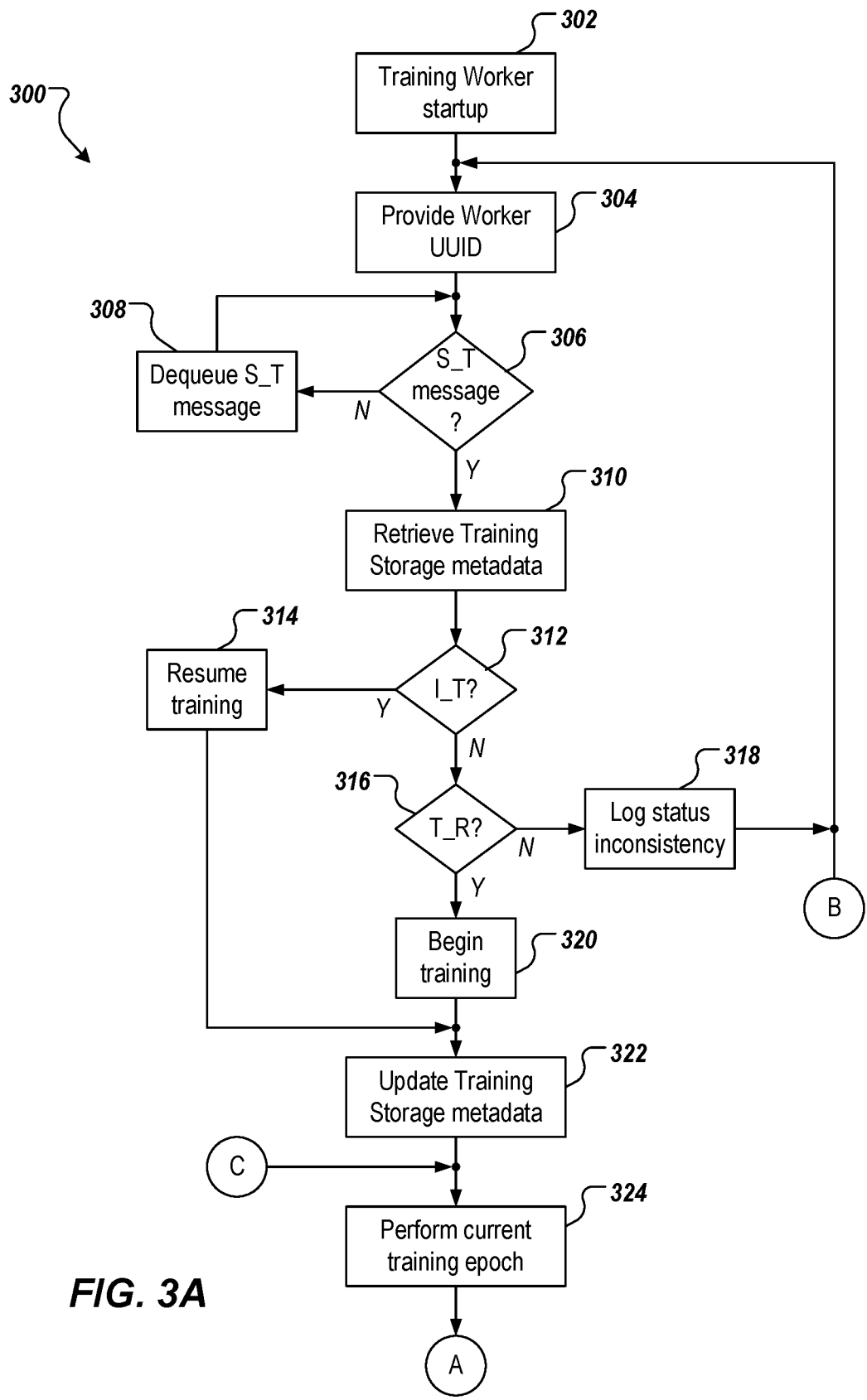
FIGS. 3A and 3B collectively depict an example process that can be executed in accordance with implementations of the present disclosure.
Figure 3B:
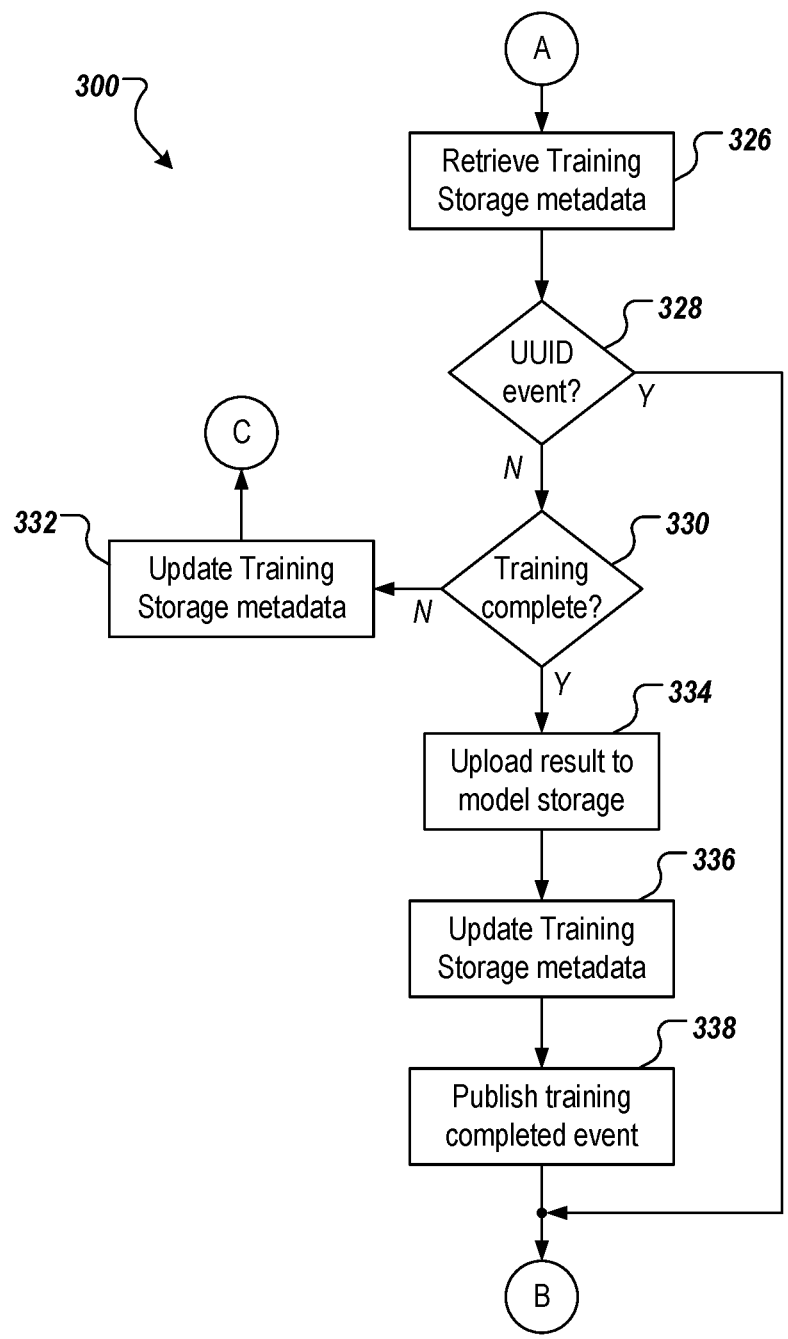

FIGS. 3A and 3B collectively depict an example process 300 that can be executed in accordance with implementations of the present disclosure. In some implementations, the example process 300 may be performed using one or more computer-executable programs executed using one or more computing devices. In some examples, at least a portion of the example training process 300 is coordinated by a training worker 118 to train a ML model.

One or more training workers are initiated (302). For example, in response to the start training request, the training master 112 instantiates at least one training worker 118 to train the ML model. The training worked is assigned a UUID (304). For example, the training master 112 assigns a UUID to the training worker 118. It is determined whether a start training (S_T) message is received by the training worker (306). If a S_T message has not been received, a next S_T message is dequeued (308). In some examples, dequeuing includes providing a blocking call to the pending training queue 126 to dequeue a single S_T message. If a S_T message is received, metadata is retrieved from training storage (310). For example, the training worker 118 requests and receives metadata from the training storage 124. In some examples, the metadata that a training worker reads from the training storage includes a training data identifier (or ML model identifier that is output from the training process), and the current training worker identifier (e.g., to prevent more than one training worker instance to work on the same training data). In some examples, the metadata that a training worker writes into the training storage includes its training worker identifier (e.g., UUID that the training worker refers to itself, mainly for keeping other training workers from trying to use an in-progress training data), last update timestamp (e.g., to identify whether a training data is still being worked on or whether the corresponding worker has unexpectedly terminated, and the training status (or ML model status), showing whether the training process completed successfully, or otherwise there was a graceful (voluntary) termination of the process.

It is determined whether the status of the ML model is I_T (312). If the status of the ML model is I_T, training is already in-progress, and is resumed (314). If the status of the ML model is not I_T, it is determined whether the status of the ML model is T_R (316). If the status of the ML model is not T_R, and inconsistency is logged (318), and the example process 300 loops back. In this case, an inconsistency is present, because training has been requested for the ML model, but the status of the ML model is neither I_T, nor T_R. In some examples, logging includes logging the UUID of the training worker 118, and the training identifier (Training_ID).

If the status is T_R, training is started (320). That is, for example, the training worker 118 begins training the ML model based on training data. Metadata in the training storage is updated (322). For example, the training worker 118 updates the status of the ML model to I_T, and writes training-related metadata (e.g., training worker UUID, last epoch timestamp) to the training storage 124. The current training epoch is performed (324). In some examples, a training epoch can be described as a full pass through a data set during a ML training process, which cycles through the sample data sets multiple times trying to minimize errors. Each cycle can be referred to as a training epoch. In some examples, during training, the sample data set is divided into three parts: a training set, a test set, and a validation set. Items from the first two sets—training and test set—are re-mixed for use in each training epoch. Within a training epoch, the training algorithm uses the training set to adjust the numerical weights of the ML model in an effort to minimize its inference errors. In turn, the test set is used for evaluating the ML model's inference errors within a training epoch, the result of which is a test error measure. At start (before the first epoch) these weights are initialized as random values. At the start of the next training epoch, the training and test sets gets recombined and then split (randomly) into another training and test set for the training epoch. At the end of the training process (after a sufficient number of training epochs have run), the ML model is used to make inferences against the validation set, the result of which is taken as the ML model's accuracy—an expected value of how the model should perform against unknown data.

Metadata is retrieved from the training storage (326). For example, training worker UUID that is handling training of the ML model is retrieved from the training storage 124. It is determined whether a training worker UUID event has occurred (328). In some examples, a training worker UUID event can include, without limitation, clearing of the UUID, or changing of the training worker UUID (e.g., the training process is to be canceled, or a new training worker is to take over the training process). If a UUID event has occurred, the example process 300 loops back. If a UUID event has not occurred, it is determined whether training is complete (330). If training is not complete, metadata is updated in the training storage (332), and the example process 300 loops back to continue training of the ML model. For example, the last training epoch TS is updated, and current epoch training progress is stored.

If training is complete, the result is uploaded to the model storage (334), and metadata is updated in the training storage (336). For example, the trained ML model is stored in the model storage 128, the status is changed to ready, and training-related metadata (e.g., training worker UUID, last epoch update) are removed from the training storage 124. A training completed event is published (338). For example, the training completed event is published to the training process topic 120, and any instances of the training worker 118 are stopped.

In some implementations, to support training of the ML model, the training instance provisioner 116 selectively scales (e.g., up, down) instances of the training workers 118. For example, the training instance provisioner 116 receives a training process event from the training process topic 120. In some examples, if the training process event indicates that training is requested, the training instance provisioner 116 determines the number of pending training requests. If the number of pending training requests exceeds a maximum threshold, the training instance provisioner 116 scales up (e.g., instantiates) one or more training workers 118. In some examples, if the training process event indicates that training of a ML model is complete, the training instance provisioner 116 determines the number of pending training requests. If the number of pending training requests does not exceed a minimum threshold, the training instance provisioner 116 scales down (e.g., stops) one or more training workers 118.

Figure 4:
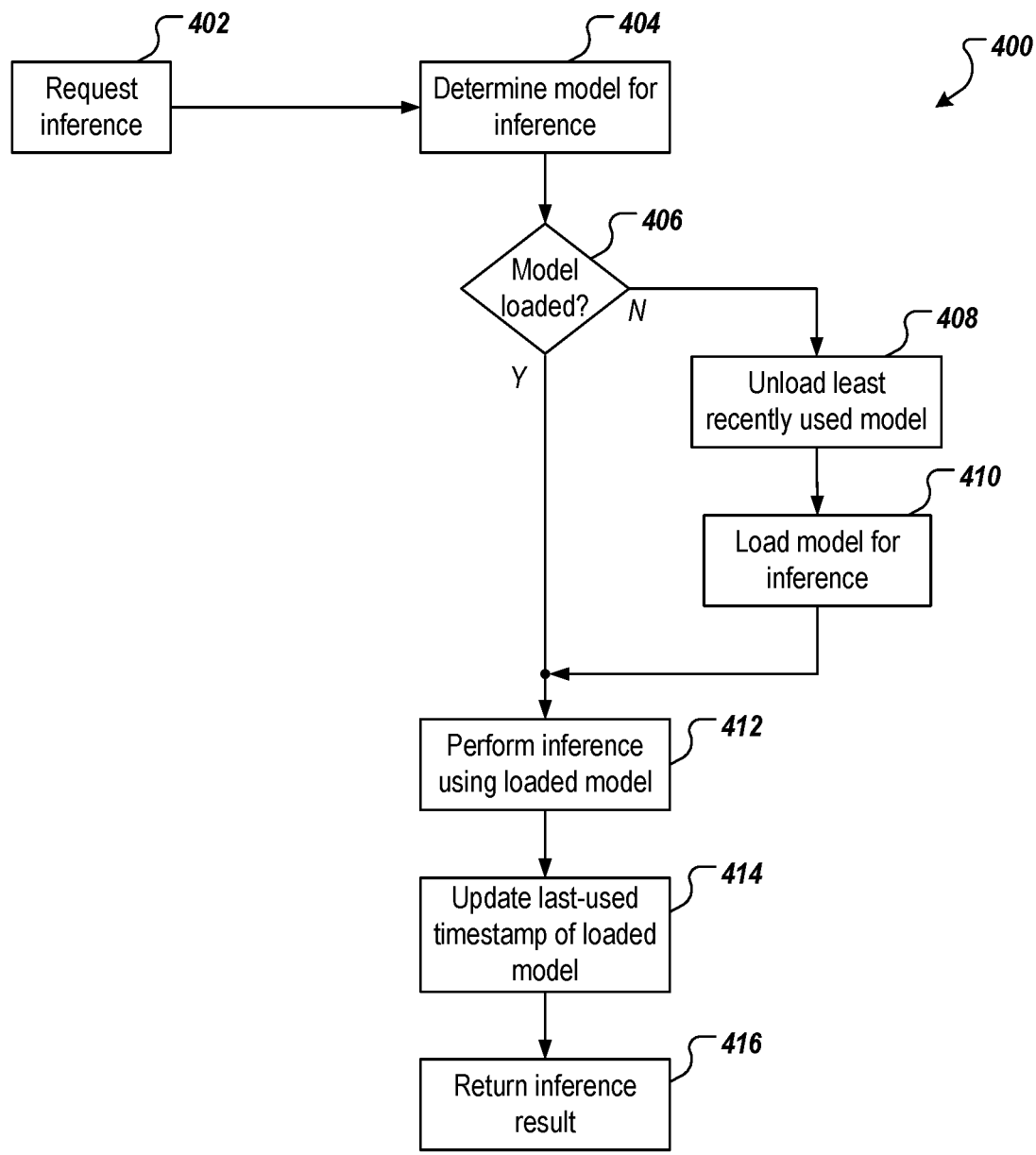
FIG. 4 depicts an example model inference process in accordance with implementations of the present disclosure.

FIG. 4 depicts an example model inference process 400 in accordance with implementations of the present disclosure. In some implementations, the example process 400 may be performed using one or more computer-executable programs executed using one or more computing devices. In some examples, at least a portion of the example inference process 400 is coordinated by an inference worker 114 to use a trained ML model to provide one or more predictions.

An inference is requested (402). For example, the client system 106 posts an activate model request indicating that an inference (prediction) is requested. In some implementations, the request indicates a ML model that is to be used in the inference (e.g., Model_ID), and data that is to be processed through the ML model to provide one or more results. The ML model that is to be used for the inference is determined (404). For example, the ML model can be identified based on the Model_ID provided in the request. It is determined whether the ML model is loaded (406). If the ML model is not loaded, the least recently used ML model is unloaded (408), and the selected ML model is loaded (410). Inference is performed using the loaded ML model (412). A last-used TS of the loaded ML model is updated (414), and the inference result (prediction) is returned (416).

Figure 5:
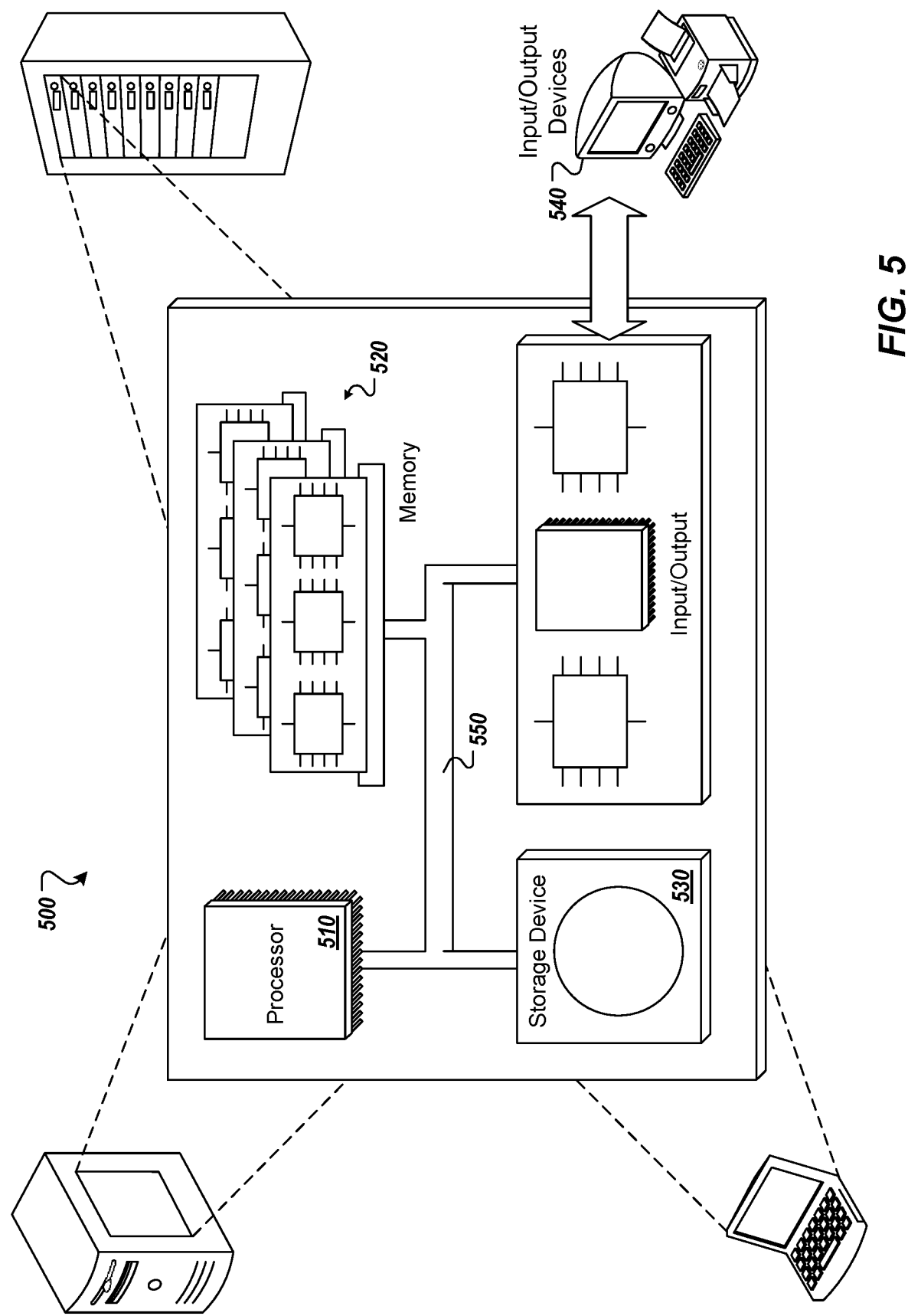
FIG. 5 is a schematic illustration of example computer systems that can be used to execute implementations of the present disclosure.

FIG. 5 depicts a schematic diagram of an example computing system 500. The system 500 may be used to perform the operations described with regard to one or more implementations of the present disclosure. For example, the system 500 may be included in any or all of the server components, or other computing device(s), discussed herein. The system 500 may include one or more processors 510, one or more memories 520, one or more storage devices 530, and one or more input/output (I/O) devices 540. The components 510, 520, 530, 540 may be interconnected using a system bus 550.

The processor 510 may be configured to execute instructions within the system 500. The processor 510 may include a single-threaded processor or a multi-threaded processor. The processor 510 may be configured to execute or otherwise process instructions stored in one or both of the memory 520 or the storage device 530. Execution of the instruction(s) may cause graphical information to be displayed or otherwise presented via a user interface on the I/O device 540.

The memory 520 may store information within the system 500. In some implementations, the memory 520 is a computer-readable medium. In some implementations, the memory 520 may include one or more volatile memory units. In some implementations, the memory 520 may include one or more non-volatile memory units.

The storage device 530 may be configured to provide mass storage for the system 500. In some implementations, the storage device 530 is a computer-readable medium. The storage device 530 may include a floppy disk device, a hard disk device, an optical disk device, a tape device, or other type of storage device. The I/O device 540 may provide I/O operations for the system 500. In some implementations, the I/O device 540 may include a keyboard, a pointing device, or other devices for data input. In some implementations, the I/O device 540 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors for training and using machine learning (ML) models in application platform-as-a-service (aPaaS) architectures, the method comprising:

receiving, at a training master provided using a virtual machine (VM), a training request to train a ML model, the training request being received from a first tenant in a multi-tenant, aPaaS architecture;

in response to the training request, training the ML model using a first training worker provided using a first VM, the first VM being stateless; and during training of the ML model, determining that a universally unique identifier (UUID) event has occurred, the UUID event comprising one of clearing a UUID of the first training worker and changing training workers for training the ML model, and in response:

assigning a UUID to a second training worker, retrieving training storage metadata that indicates a training status of the ML model from a plurality of training statuses, initiating, by the training master, training of the ML model by the second training worker provided using a second VM, the training being executed based on the training status, and the second VM being stateless, during training of the ML model, periodically updating the training storage metadata based on metadata describing progress of the training of the ML model and monitoring for occurrence of one or more UUID events, and in response to completion of the training of the ML model, storing a trained ML model in a model storage of the aPaaS architecture.

2. The method of claim 1, wherein initiating training of the ML model is performed in response to determining that the ML model is able to be trained based on one or more of a status of the ML model, and a timestamp associated with the ML model.

3. The method of claim 1, further comprising, during training of the ML model, scaling, by a training instance provisioner, a number of instances of training workers based on one or more of a number of pending training requests, and a number of completed trainings.

4. The method of claim 1, further comprising determining that training of the ML model by the second training worker provided using the second VM was incomplete, and in response continuing training of the ML model by a third training worker provided using a third VM.

5. The method of claim 4, wherein training of the ML model is continued based on the metadata describing progress of the training of the ML model stored in the training storage metadata.

6. The method of claim 1, further comprising:

receiving, by an inference worker provided using a third VM, an inference request to provide an inference result using the trained ML model; and processing the inference request to return the inference result.

7. The method of claim 1, wherein the second VM comprises more computing resources than the first VM.

8. A non-transitory computer-readable storage medium coupled to one or more processors and having instructions stored thereon which, when executed by the one or more processors, cause the one or more processors to perform operations for training machine learning (ML) models in application platform-as-a-service (aPaaS) architectures, the operations comprising:

receiving, at a training master provided using a virtual machine (VM), a training request to train a ML model, the training request being received from a first tenant in a multi-tenant, aPaaS architecture;

in response to the training request, training the ML model using a first training worker provided using a first VM, the first VM being stateless; and during training of the ML model, determining that a universally unique identifier (UUID) event has occurred, the UUID event comprising one of clearing a UUID of the first training worker and changing training workers for training the ML model, and in response:

assigning a UUID to a second training worker, retrieving training storage metadata that indicates a training status of the ML model from a plurality of training statuses, initiating, by the training master, training of the ML model by the second training worker provided using a second VM, the training being executed based on the training status, and the second VM being stateless, during training of the ML model, periodically updating the training storage metadata based on metadata describing progress of the training of the ML model and monitoring for occurrence of one or more UUID events, and in response to completion of the training of the ML model, storing a trained ML model in a model storage of the aPaaS architecture.

9. The computer-readable storage medium of claim 8, wherein initiating training of the ML model is performed in response to determining that the ML model is able to be trained based on one or more of a status of the ML model, and a timestamp associated with the ML model.

10. The computer-readable storage medium of claim 8, wherein operations further comprise, during training of the ML model, scaling, by a training instance provisioner, a number of instances of training workers based on one or more of a number of pending training requests, and a number of completed trainings.

11. The computer-readable storage medium of claim 8, wherein operations further comprise determining that training of the ML model by the second training worker provided using the second VM was incomplete, and in response continuing training of the ML model by a third training worker provided using a third VM.

12. The computer-readable storage medium of claim 11, wherein training of the ML model is continued based on the metadata describing progress of the training of the ML model stored in the training storage metadata.

13. The computer-readable storage medium of claim 8, wherein operations further comprise:

receiving, by an inference worker provided using a third VM, an inference request to provide an inference result using the trained ML model; and processing the inference request to return the inference result.

14. The computer-readable storage medium of claim 8, wherein the second VM comprises more computing resources than the first VM.

15. A system, comprising:

a computing device; and a computer-readable storage device coupled to the computing device and having instructions stored thereon which, when executed by the computing device, cause the computing device to perform operations for training machine learning (ML) models in application platform-as-a-service (aPaaS) architectures, the operations comprising:

receiving, at a training master provided using a virtual machine (VM), a training request to train a ML model, the training request being received from a first tenant in a multi-tenant, aPaaS architecture;

in response to the training request, training the ML model using a first training worker provided using a first VM, the first VM being stateless; and during training of the ML model, determining that a universally unique identifier (UUID) event has occurred, the UUID event comprising one of clearing a UUID of the first training worker and changing training workers for training the ML model, and in response:

assigning a UUID to a second training worker, retrieving training storage metadata that indicates a training status of the ML model from a plurality of training statuses, initiating, by the training master, training of the ML model by the second training worker provided using a second VM, the training being executed based on the training status, and the second VM being stateless, during training of the ML model, periodically updating the training storage metadata based on metadata describing progress of the training of the ML model and monitoring for occurrence of one or more UUID events, and in response to completion of the training of the ML model, storing a trained ML model in a model storage of the aPaaS architecture.

16. The system of claim 15, wherein initiating training of the ML model is performed in response to determining that the ML model is able to be trained based on one or more of a status of the ML model, and a timestamp associated with the ML model.

17. The system of claim 15, wherein operations further comprise, during training of the ML model, scaling, by a training instance provisioner, a number of instances of training workers based on one or more of a number of pending training requests, and a number of completed trainings.

18. The system of claim 15, wherein operations further comprise determining that training of the ML model by the second training worker provided using the second VM was incomplete, and in response continuing training of the ML model by a third training worker provided using a third VM.

19. The system of claim 18, wherein training of the ML model is continued based on the metadata describing progress of the training of the ML model stored in the training storage metadata.

20. The system of claim 15, wherein operations further comprise:

receiving, by an inference worker provided using a third VM, an inference request to provide an inference result using the trained ML model; and processing the inference request to return the inference result.

* * * * *